Nov. 6, 1923.
B. W. JONES
1,473,561
AUTOMOBILE IDENTIFYING MEANS
Filed July 6, 1922
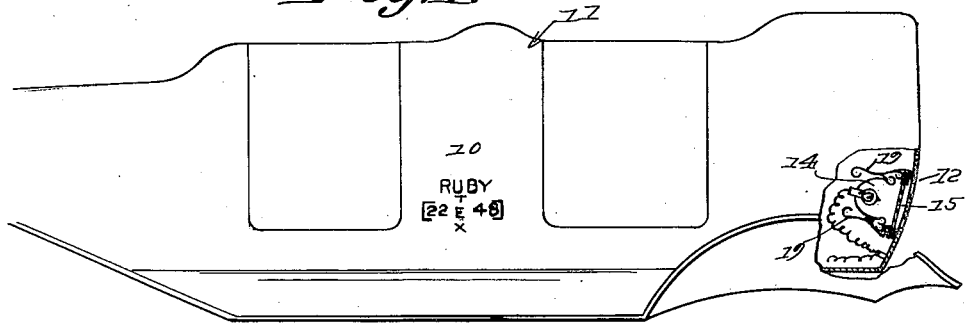
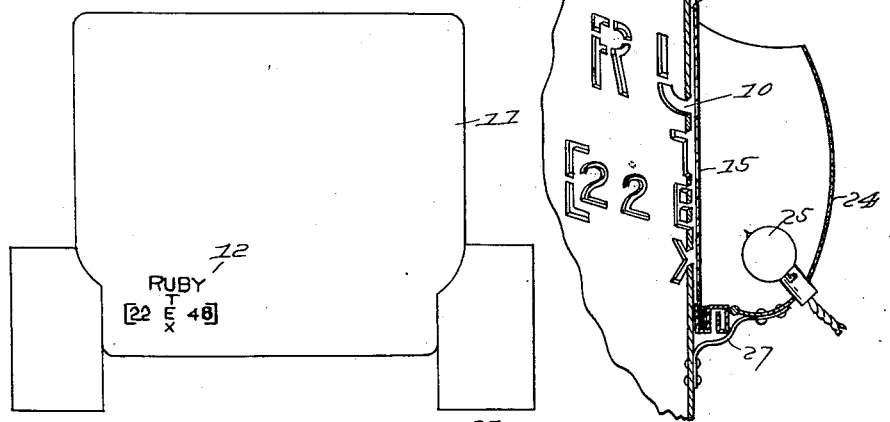
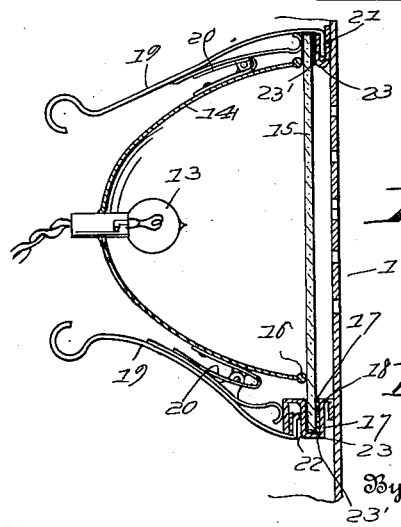
Inventor
Branham W. Jones,
By G. Hume Talbert
Attorney Patented Nov. 6, 1923.

1,473,561

UNITED STATES PATENT OFFICE.

BRANHAM W. JONES, OF SAN ANTONIO, TEXAS.

AUTOMOBILE IDENTIFYING MEANS.

Application filed July 6, 1922. Serial No. 573,216.

*To all whom it may concern:*

Be it known that BRANHAM W. JONES, a citizen of the United States of America, residing at San Antonio, in the county of Bexar and State of Texas, has invented new and useful Improvements in Automobile Identifying Means, of which the following is a specification.

The object of the invention is to provide a permanent or ineffaceable identifying means for automobiles and similar vehicles, which under authorized conditions may be utilized as an evidence of license to operate the vehicle, as for example where the system of granting licenses provides for the assignment of a given number to the car and which remains unchanged in reference to that car even though the ownership of the property may be transferred, and for example where the license number as applied to the particular car is a matter of record which must be altered to indicate the name of the owner in the event of transfer of the property by sale or otherwise; and furthermore to provide a means of identification as applied to the car itself which when used as evidence of a license can be readily seen and read even when the car is in rapid motion; and with these objects in view, the invention consists in a construction and combination of parts of which a preferred embodiment is shown in the accompanying drawings, wherein:—

Figure 1 is a side view of a portion of a car body partly broken away to indicate side and rear end identifying means.

Figure 2 is a rear view of a car body showing the rear end identifying means in elevation.

Figures 3 and 4 are sectional views respectively of the side and rear end identifying means.

The identifying means consists essentially of a punctured or cut-out plate 10 of which the openings represent letters, numerals or other selected symbols constituting a specific identification of the particular vehicle in connection with which the same is used as for example, as illustrated in the drawing the letters representing the word "Ruby," to designate the style or origin or maker or type of the car, the letters "Tex" representing the State by which the identification or license was issued, and the numerals 22 and 48, separately grouped to represent respectively a class, county or municipal number and a specific or car number, behind which is arranged a lighting unit designed to project light through the openings representing the mark of identification, so as to facilitate the recognition and reading thereof. It is preferred that the perforated plate bearing the identification symbols of whatever type, character and arrangement may be selected for the particular locality and jurisdiction under which the car is licensed, forms a part of the wall of the car body indicated at 11, and shown in the drawing as consisting in one instance of a portion of the side wall of the car body and in the other a portion of a rear end wall thereof as indicated at 12, so that the identification or license number may readily be seen from either the side or the rear of the car whether in motion or at rest.

The illuminating or lighting means embodies a lighting unit such as an incandescent electric globe 13 arranged within a casing 14 constituting a reflector. The lens 15 is disposed directly behind the punctured zone 12 of the vehicle wall and at its lower edge rests in a seat 17 of a channel bracket 18 secured to the inner face of the vehicle wall. At the upper edge the lens bears against the outer flange of a channel 21. Suitable packing 23 is interposed between the edges of the lens and the bracket which it engages. The casing 14 is peripherally beaded, as indicated at 16; to bear against the rear face of the lens and carries clip levers 19 actuated by springs 20, the clip levers being arranged on the top and bottom of the casing and having inwardly directed terminals of which that of the upper clip lever engages in the channel of the bracket 21 and that of the lower clip lever in the channel 22 carried by the bracket 17 and oppositely disposed with respect to the seat in which the lower edge of the lens rests. Obviously, the casing and lens may be readily removed by disengaging the clip levers from their respective channels, they serving to hold the casing and the lens in place, except to support the weight of the lens which is carried by the lower bracket 17.

In Figure 3 there is shown a lighting means particularly adapted for use at the side of the car wherein the reflector 24 which carries the lighting unit 25 is supported by upper and lower brackets 26 and 27 suitably secured to the wall of the car body and otherwise corresponding in general features of construction with the illuminating device shown in Figure 4 which is more especially adapted for use at the rear end of the car and which is adapted if desired to also perform the function of a tail light.

It will be obvious that an identifying means such as herein disclosed cannot be obliterated or effaced by the methods ordinarily employed by those who surreptitiously appropriate vehicles of this type and who usually resort to obliterating identifying marks, repainting bodies and the like. The cutting of the identifying symbols or characters in the material forming the walls of the body effectually precludes obliteration by these customary methods and provides a permanency of marking which can be recognized as long as the body remains in existence.

Having described the invention, what is claimed as new and useful is:—

An identifying means for vehicle bodies consisting of a punctured plate constituting a portion of the wall of the vehicle body with the punctures arranged to represent vehicle identifying indicia, in conjunction with a bracket secured to the rear face of the vehicle wall below said indicia, said bracket having a channel, a lens disposed in rear of said indicia and having its lower edge resting in said channel, a casing having an inner wall constituting a reflector, said casing being open at one side and bearing on the lens at the open side, a bracket disposed above the indicia and secured to the inner face of the vehicle wall, and spring-actuated clip levers secured to the casing above and below the same and having inturned terminals engaging channels formed in said brackets, said casing being provided with an illuminating medium.

In testimony whereof he affixes his signature.

BRANHAM W. JONES.